(12) United States Patent
Jeon

(10) Patent No.: US 9,082,317 B2
(45) Date of Patent: Jul. 14, 2015

(54) METHOD AND APPARATUS FOR DISPLAYING DIGITAL MAP IN CLIENT

(71) Applicant: Samsung Electronics Co. Ltd., Suwon-si, Gyeonggi-do (KR)

(72) Inventor: Yong-Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 13/660,220

(22) Filed: Oct. 25, 2012

(65) Prior Publication Data

US 2013/0169689 A1 Jul. 4, 2013

(30) Foreign Application Priority Data

Jan. 4, 2012 (KR) ........................ 10-2012-0000939

(51) Int. Cl.
*G09G 5/00* (2006.01)
*G09B 29/10* (2006.01)

(52) U.S. Cl.
CPC .................................. *G09B 29/106* (2013.01)

(58) Field of Classification Search
None
See application file for complete search history.

(56) References Cited

U.S. PATENT DOCUMENTS

| 6,396,507 | B1 * | 5/2002 | Kaizuka et al. ............... 345/661 |
| 6,956,590 | B1 * | 10/2005 | Barton et al. ................. 345/684 |
| 7,405,739 | B2 * | 7/2008 | Gannon ........................ 345/660 |
| 7,496,484 | B2 * | 2/2009 | Agrawala et al. ................ 703/2 |
| 8,139,089 | B2 * | 3/2012 | Doyle et al. ................... 345/647 |
| 8,223,172 | B1 * | 7/2012 | Miller et al. .................. 345/660 |
| 8,225,225 | B2 * | 7/2012 | Jetha et al. .................... 715/769 |
| 8,269,797 | B2 * | 9/2012 | Uchida et al. ................. 345/668 |
| 8,274,571 | B2 * | 9/2012 | Zhu ............................ 348/211.3 |
| 8,687,017 | B2 * | 4/2014 | Shoemaker ................... 345/619 |
| 8,711,181 | B1 * | 4/2014 | Nourse et al. ................. 345/660 |
| 8,760,473 | B2 * | 6/2014 | Houllier et al. ............... 345/647 |
| 8,836,721 | B1 * | 9/2014 | Wichary et al. ............... 345/629 |
| 2007/0064018 | A1 * | 3/2007 | Shoemaker et al. .......... 345/660 |
| 2011/0069086 | A1 * | 3/2011 | Shoemaker et al. .......... 345/641 |
| 2011/0191014 | A1 * | 8/2011 | Feng et al. .................... 701/200 |
| 2013/0100162 | A1 * | 4/2013 | Iseri ............................. 345/629 |
| 2013/0147846 | A1 * | 6/2013 | Kalai et al. .................... 345/660 |

\* cited by examiner

*Primary Examiner* — Ryan R Yang
(74) *Attorney, Agent, or Firm* — Jefferson IP Law, LLP

(57) ABSTRACT

A method and apparatus for displaying a digital map in a client is provided. The method includes determining a part to be magnified and displayed on the digital map, displaying a magnified map image corresponding to the determined part, receiving information about the magnified map image from a server, and displaying the information received from the server on the magnified map image.

20 Claims, 4 Drawing Sheets

METHOD AND APPARATUS FOR DISPLAYING DIGITAL MAP IN CLIENT

PRIORITY

This application claims the benefit under 35 U.S.C. §119(a) of a Korean patent application filed in the Korean Intellectual Property Office on Jan. 4, 2012 and assigned Serial No. 10-2012-0000939, the entire disclosure of which is hereby incorporated by reference.

BACKGROUND OF THE INVENTION

1. Field of the Invention

The present invention relates to a method and an apparatus for displaying a digital map in a client. More particularly, the present invention relates to a method and an apparatus for magnifying and displaying a part of a digital map.

2. Description of the Related Art

Portable terminals such as mobile terminals and personal complex terminals have become necessities of current society. The portable terminals have developed into important means of information transmission, which are quickly changed. Users of the portable terminals may use a variety of services on the Internet through the portable terminals.

Recently, a digital map service may catch users' attention. The digital map service provides geographic positions for facilities or provides place/location names on a digital map and allows the users to search the digital map.

The digital map service magnifies a digital map and provides more detailed geographic information to the users. In general, when the user requests a server to magnify a digital map output to a portable terminal (e.g., a client), the server performs a method according to the related art which includes generating a magnified map image on which detailed information items (e.g., building names, place names, and the like) are displayed, and providing the generated map image to the portable terminal. This method according to the related art magnifies and displays the entire map without magnifying and displaying only a specific part of the map.

Therefore, there is a problem in that efficiency in a data processing time and a data throughput is degraded because the server generates a map image enlarging the entire map and provides the generated map image to the portable terminal.

Therefore, a need exists for a method and an apparatus for displaying a digital map to magnify and display only a specific part of the digital map.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for displaying a digital map to magnify and display only a specific part of the digital map.

Another aspect of the present invention is to provide a method and apparatus for displaying a digital map to more quickly search the digital map by magnifying and displaying a map image of a specific part of the digital map, acquiring only detailed information about the magnified and displayed map image from a server, and displaying the acquired detailed information on the magnified map image.

In accordance with an aspect of the present invention, a method of displaying a digital map is provided. The method includes determining a part to be magnified on the digital map, displaying a magnified map image corresponding to the determined part, receiving information about the magnified map image from a server, and displaying the information received from the server on the magnified map image.

In accordance with another aspect of the present invention, an apparatus for displaying a digital map is provided. The apparatus includes a GIS-based application system for determining a part to be displayed on the digital map, for displaying a magnified map image corresponding to the determined part, receiving information about the magnified map image from a server, and displaying the information received from the server on the magnified map image.

In accordance with another aspect of the present invention, a digital map service system is provided. The digital map service system includes a server, and a client including a GIS-based application system for determining a part to be magnified on the digital map, for displaying a magnified map image corresponding to the determined part, for receiving information about the magnified map image from the server, and for displaying the information received from the server on the magnified map image, wherein the server provides to the client information corresponding to a request of the client.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention described hereinafter relate to a method and apparatus for magnifying and displaying only a specific part of a digital map in client. In accordance with one exemplary embodiment of the present invention, because the client acquires only information necessary for generating a map image magnifying and displaying a specific part of the digital map from a server, it allows a user to more quickly search the digital map.

Figure 1:
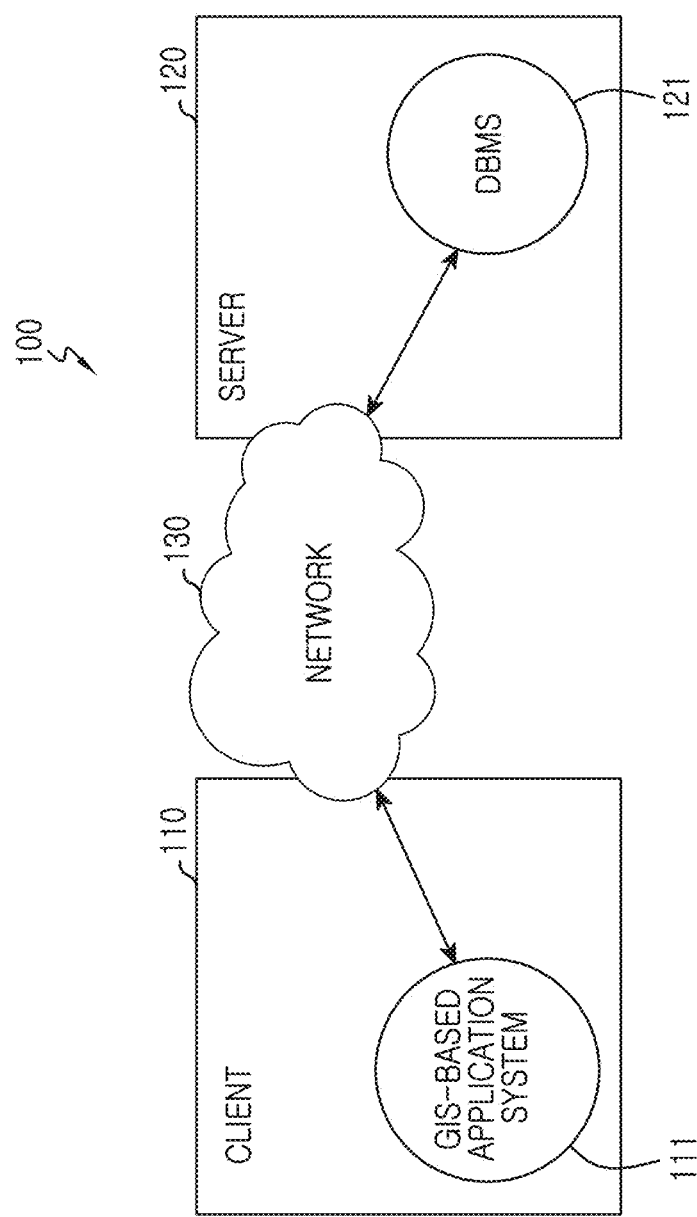
FIG. 1 is a block diagram of a digital map service system according to an exemplary embodiment of the present invention.

FIG. 1 is a block diagram of a digital map service system according to an exemplary embodiment of the present invention.

Referring to FIG. 1, the digital map service system denoted by 100 includes a client 110 including a Geographic Information System (GIS)-based application system 111 and a server 120 including a DataBase Management System (DBMS) 121.

The GIS-based application system 111 of the client 110 corresponds to a system capable of analyzing and processing geospatial data and using the processed data in geomorphic related fields such as a traffic field and a communication field. The GIS-based application system 111 may provide an interactive user interface and may transmit and receive map related data with the server 120 through a network 130.

The DBMS 121 of the server 120 allows a plurality of clients to access a data of a DB. In addition, the DBMS 121 stores and manages information about a digital map.

In accordance with one exemplary embodiment of the present invention, the client 110 magnifies and displays a map image of a specific part of the digital map at a set magnification rate and requests the server 120 to transmit detailed information about the magnified and displayed map image. The server 120 provides the corresponding detailed information to the client 110. The client 110 displays the detailed information provided from the server 120 on the magnified map image. As an example, the detailed information provided from the server 120 includes position information, geomorphic information, Point Of Interest (POI) information, and the like, each of which may be based on vertex data.

Figure 2:
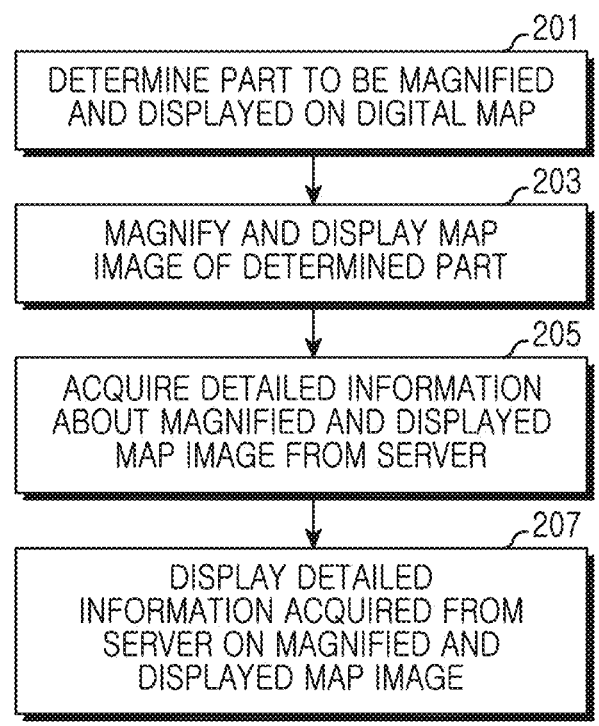
FIG. 2 is a flowchart illustrating a process of magnifying a part of a digital map in a client according to an exemplary embodiment of the present invention.

FIG. 2 is a flowchart illustrating a process of magnifying a part of a digital map in a client according to an exemplary embodiment of the present invention.

Referring to FIGS. 1 and 2, the GIS-based application system 111 of the client 110 determines a part to be magnified and displayed on a digital map in step 201. For example, the GIS-based application system 111 determines a predetermined range based on a touch point on a touch screen. The GIS-based application system 111 may change the part to be magnified and displayed on the digital map according to movement of the touch point. In addition, the GIS-based application system 111 allows a user to set a range for the part to be magnified and displayed. For example, the range set by the user may be at least one of shapes such as a circle and a quadrangle.

The GIS-based application system 111 proceeds to step 203 and magnifies and displays a map image of the determined part. For example, the GIS-based application system 111 magnifies and displays the map image of the determined part with reference to a predetermined magnification. The GIS-based application system 111 may allow the user to change the magnification. When the magnification is changed, the GIS-based application system 111 magnifies and displays the map image of the determined part at the changed magnification.

According to exemplary embodiments of the present invention, the GIS-based application system 111 provides the magnified and displayed map image through a window overlaid on the digital map. As an example, the GIS-based application system 111 adjusts a size of the overlaid window according to the magnification. For example, if the magnification is increased, the overlaid window is also increased in size. As another example, if the magnification is decreased, the overlaid window is also decreased in size.

The GIS-based application system 111 proceeds to step 205 and acquires detailed information about the magnified and displayed map image from the server 120. As an example, the detailed information includes position information, geomorphic information, POI information, and the like. As an example, the detailed information is based on a vertex data.

The GIS-based application system 111 proceeds to step 207 and displays the detailed information acquired from the server 120 on the magnified and displayed map image. When it is verified that a part to be magnified and displayed on the digital map is changed, the GIS-based application system 111 performs the processing from step 201 with respect to the changed part. In addition, when the part to be magnified and displayed on the digital map is changed, the GIS-based application system 111 moves the overlaid window and provides the moved window interactively. For example, a part to be magnified is changed according to movement of a touch point. As an example, the overlaid window displays a map image updated in real time according to the change of the part to be magnified. The overlaid window is moved according to the movement of the touch point.

A user interface for magnifying a part of a digital map according to an exemplary embodiment of the present invention may provide one of a hardware-like button installed in the client 110, a software-like button, and a touch event as a means.

Figure 3A:
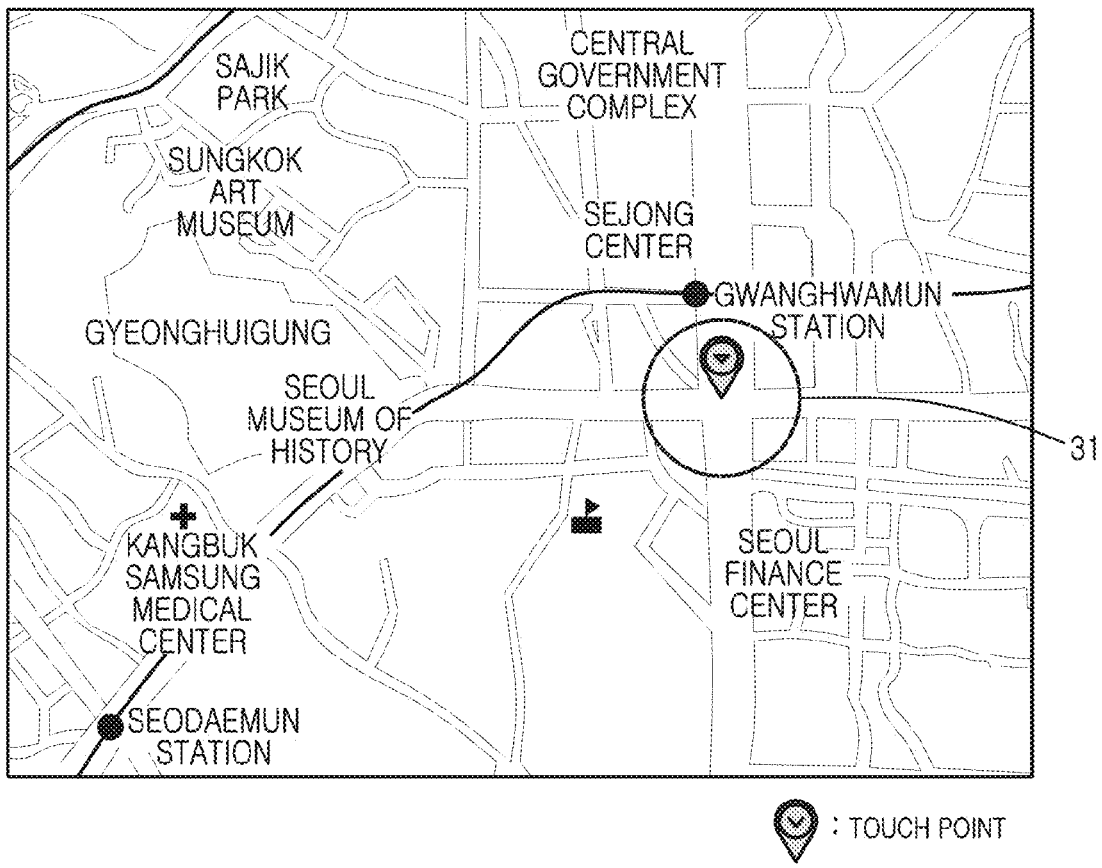
FIGS. 3A and 3B are user interface pictures illustrating a process of magnifying a part of a digital map in a client according to an exemplary embodiment of the present invention.
Figure 3B:
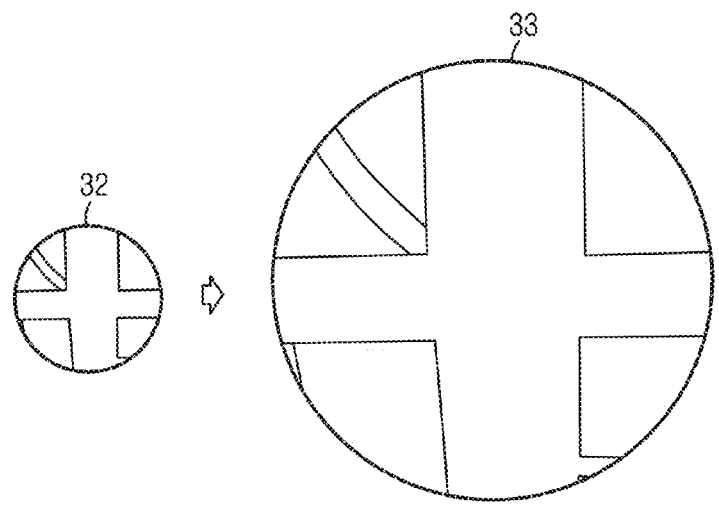
Figure 3B:
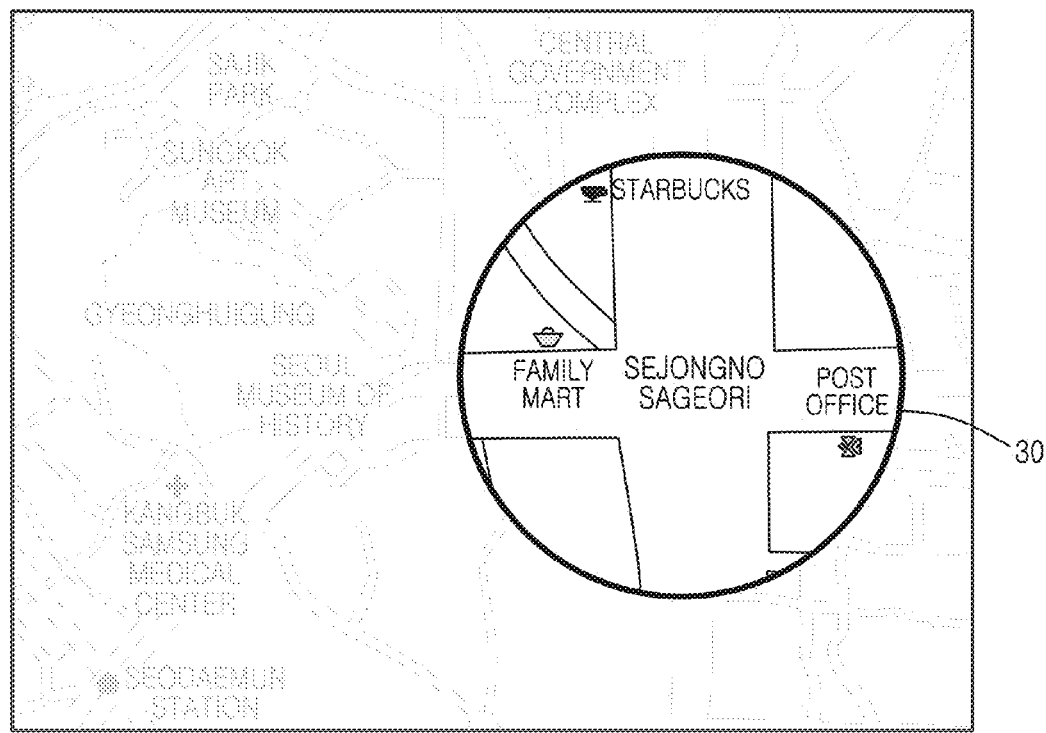

FIGS. 3A and 3B are user interface pictures illustrating a process of magnifying a part of a digital map in a client according to an exemplary embodiment of the present invention.

Referring to FIGS. 1 and 3A, a user touches a part to be magnified on a digital map. For example, the GIS-based application system 111 determines an area which has a circle of a certain radius as confines based on a touch point as a part 31 to be magnified.

Referring to FIGS. 1, 3A, and 3B, the GIS-based application system 111 magnifies and displays a map image 32 of the determined part 31 at a set magnification. The GIS-based application 111 provides the magnified and displayed map image 33 through a window 30 overlaid on the digital map. The GIS-based application system 111 acquires detailed information about the magnified and displayed mage image 33 from the server 120 and displays the detailed information acquired from the server 120 on the magnified and displayed map image.

As described above, when the part to be magnified is changed, the GIS-based application system 111 repeatedly performs a certain process of magnifying and displaying a new map image of the changed part, acquiring detailed information about the magnified and displayed map image from the server 120, and displaying the detailed information acquired from the sever 120 on the magnified and displayed map image. In addition, when the magnification is changed, the GIS-based application system 111 repeatedly performs a certain process of magnifying and displaying a map image of the determined part at the changed magnification, acquiring detailed information about the magnified map image from the server 120, and displaying the detailed information acquired from the server 120 on the magnified and displayed map image.

According to exemplary embodiments of the present invention, the a client 110 including a Geographic Information System (GIS)-based application system 111 may be a mobile devices such as a cellular phone, a personal digital assistant (PDA), a digital camera, a portable game console, and an MP3 player, a Portable/Personal Multimedia Player (PMP), a handheld e-book, a portable lap-top PC, a Global Positioning System (GPS) navigation, and devices such as a desktop PC, a High Definition Television (HDTV), a setup box, and the like capable of wireless communication or network communication consistent with that disclosed herein.

It will be appreciated that exemplary embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. As an example, any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement exemplary embodiments of the present invention.

Accordingly, exemplary embodiments of the present invention provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

In conclusion, a method and apparatus for displaying a digital map in a client according to an exemplary embodiment of the present invention more easily searches the digital map by quickly magnifying and displaying a part which a user wants to magnify and display without magnifying the entire map.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of displaying a digital map in a client, the method comprising:
   determining a part to be magnified on the digital map;
   displaying a magnified map image corresponding to the determined part;

receiving detailed geographic information only about the magnified map image from a server; and displaying the detailed geographic information received from the server on the magnified map image.

2. The method of claim 1, wherein the determining of the part to be magnified on the digital map comprises determining a set range based on a point and changing the part to be magnified on the digital map according to movement of the point.

3. The method of claim 1, wherein the displaying of the magnified map image of the determined part comprises magnifying and displaying the map image of the determined part at a changed magnification according to a corresponding change of the magnification.

4. The method of claim 1, wherein the displaying of the magnified map image of the determined part comprises providing the magnified and displayed map image through a window overlaid on the digital map.

5. The method of claim 4, wherein the displaying of the magnified map image of the determined part comprises adjusting a size of the window overlaid on the digital map according to a magnification.

6. The method of claim 4, wherein the displaying of the magnified map image corresponding to the determined part comprises determining a position of the window overlaid on the digital map according to the determined part.

7. The method of claim 1, wherein the receiving of the detailed geographic information about the magnified map image from the server comprises receiving the detailed geographic information including at least one of position information, geomorphic information, and POI information from the server, and wherein the at least one of the position information, the geomorphic information, and the POI information are based on vertex data.

8. An apparatus for displaying a digital map in a client, the apparatus comprising:

a GIS-based application system for determining a part to be magnified on the digital map, for displaying a magnified map image corresponding to the determined part, for receiving detailed geographic information only about the magnified map image from a server, and for displaying the detailed geographic information received from the server on the magnified map image.

9. The apparatus of claim 8, wherein the GIS-based application system determines a set range based on a point and changes the part to be magnified on the digital map according to movement of the point.

10. The apparatus of claim 8, wherein the GIS-based application system magnifies and displays the map image of the determined part at a changed magnification according to a corresponding change of the magnification.

11. The apparatus of claim 8, wherein the GIS-based application system provides the magnified and displayed map image through a window overlaid on the digital map.

12. The apparatus of claim 11, wherein the GIS-based application system adjusts a size of the window overlaid on the digital map according to a magnification.

13. The apparatus of claim 11, wherein the GIS-based application system determines a position of the window overlaid on the digital map according to the determined part.

14. The apparatus of claim 8, wherein the GIS-based application system receives the detailed geographic information from the server including at least one of position information, geomorphic information, and POI information, and wherein the at least one of the position information, the geomorphic information, and the POI information are based on vertex data.

15. A digital map service system, the system comprising:

a server; and a client including a GIS-based application system for determining a part to be magnified on the digital map, for displaying a magnified map image corresponding to the determined part, for receiving detailed geographic information only about the magnified map image from the server, and for displaying the detailed geographic information received from the server on the magnified map image, wherein the server provides to the client detailed geographic information corresponding to a request of the client.

16. The system of claim 15, wherein the detailed geographic information received from the server includes at least one of position information, geomorphic information, and POI information, and wherein the at least one of the position information, the geomorphic information, and the POI information are based on vertex data.

17. The system of claim 15, wherein the GIS-based application system determines a set range based on a point and changes the part to be magnified on the digital map according to movement of the point.

18. The system of claim 15, wherein the GIS-based application system magnifies and displays the map image of the determined part at a changed magnification according to a corresponding change of the magnification.

19. The system of claim 15, wherein the GIS-based application system provides the magnified and displayed map image through a window overlaid on the digital map.

20. The system of claim 19, wherein the GIS-based application system adjusts a size of the window overlaid on the digital map according to a magnification.

* * * * *